United States Patent
Kantamneni et al.

(10) Patent No.: US 12,236,282 B2
(45) Date of Patent: *Feb. 25, 2025

(54) SYSTEMS AND METHODS FOR CHOOSING AN APPROPRIATE SCALING TECHNIQUE FOR ALLOCATING COMPUTATIONAL RESOURCES TO DISTRIBUTED APPLICATIONS

(71) Applicant: Capital One Services, LLC, McLean, VA (US)

(72) Inventors: Manideep Kantamneni, Glen Allen, VA (US); Tariq Bhatti, Richmond, VA (US); Jayasri Chadalavada, Vienna, VA (US); Shantanu Mantri, Marietta, GA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,242

(22) Filed: May 9, 2024

(65) Prior Publication Data
US 2024/0345898 A1    Oct. 17, 2024

Related U.S. Application Data

(63) Continuation of application No. 17/362,398, filed on Jun. 29, 2021, now Pat. No. 12,008,416.

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| | | |
|---|---|---|
| 6,681,323 B1 | 1/2004 | Fontanesi |
| 9,015,837 B1 | 4/2015 | de los Reyes |
| 9,239,996 B2 | 1/2016 | Moorthi |
| 9,645,847 B1 | 5/2017 | Roth |
| 9,804,890 B1 | 10/2017 | Pai |
| 9,848,041 B2 | 12/2017 | Einkauf |
| 9,912,607 B2 | 3/2018 | Steinder |
| 10,237,176 B2 | 3/2019 | Mutnuru |

(Continued)

*Primary Examiner* — Adam Lee
(74) *Attorney, Agent, or Firm* — TROUTMAN PEPPER LOCKE LLP; Christopher J. Forstner; John A. Morrissett

(57) ABSTRACT

A system including: one or more processors; a memory storing computer program code that controls the one or more processors to: receive usage metrics associated with a first application; determine whether the first application comprises a cyclic usage pattern, a batch usage pattern, or a non-cyclic usage pattern; select a scaling technique based on the determination; and automatically scale the first application with the selected scaling technique. The system may determine that at least one virtual machine should be added to a first plurality of virtual machines in response to a resource usage of an application exceeding a maximum usage allocation and determine that at least one virtual machine should be removed to the first plurality of virtual machines in response to a minimum usage allocation exceeding the resource usage of the first plurality of virtual machine instances.

20 Claims, 8 Drawing Sheets

(56) References Cited

U.S. PATENT DOCUMENTS

| | | |
|---|---|---|
| 10,248,461 B2 | 4/2019 | Pai |
| 10,503,553 B1 | 12/2019 | Ashok |
| 11,061,930 B1 | 7/2021 | Golding |
| 11,550,635 B1 | 1/2023 | Wong |
| 11,656,912 B1 | 5/2023 | Burgin |
| 2005/0166264 A1 | 7/2005 | Yamada |
| 2010/0131959 A1 | 5/2010 | Spiers |
| 2011/0219377 A1 | 9/2011 | Gowda |
| 2015/0135176 A1 | 5/2015 | Kruglick |
| 2016/0291967 A1 | 10/2016 | Badri |
| 2016/0359683 A1 | 12/2016 | Bartfai-Walcott |
| 2017/0354349 A1 | 12/2017 | Mohapatra |
| 2018/0004575 A1 | 1/2018 | Marriner |
| 2019/0163466 A1 | 5/2019 | Kiyama |
| 2019/0164080 A1 | 5/2019 | Stefani |
| 2019/0190804 A1 | 6/2019 | Tang |
| 2019/0325370 A1 | 10/2019 | Das |
| 2019/0386966 A1 | 12/2019 | Ostrikov |
| 2020/0084042 A1 | 3/2020 | Nelson |
| 2020/0264965 A1 | 8/2020 | Harutyunyan |
| 2020/0301723 A1 | 9/2020 | Gabrielson |
| 2021/0141900 A1 | 5/2021 | Brown |
| 2021/0157702 A1 | 5/2021 | Lemberg |
| 2022/0068280 A1 | 3/2022 | Bolanos |
| 2022/0121968 A1 | 4/2022 | Chandak |
| 2022/0129525 A1 | 4/2022 | Young |
| 2022/0222097 A1 | 7/2022 | Lokesharadhya |
| 2022/0321480 A1 | 10/2022 | Brown |

SYSTEMS AND METHODS FOR CHOOSING AN APPROPRIATE SCALING TECHNIQUE FOR ALLOCATING COMPUTATIONAL RESOURCES TO DISTRIBUTED APPLICATIONS

CROSS-REFERENCE TO RELATED APPLICATIONS

This application is a continuation of, and claims priority under 35 U.S.C. § 120 to, U.S. patent application Ser. No. 17/362,398, filed Jun. 29, 2021, the entire contents of which are fully incorporated herein by reference.

FIELD

The disclosed technology generally relates to resource management, and, more particularly, systems and methods for managing virtual instances dedicated to executing one or more distributed applications, and automatically selecting an appropriate scaling technique for the virtual instances based on the requirements of the distributed application and the determined traffic patterns.

BACKGROUND

The advent of cloud computing allows for businesses to execute distributed applications on virtual instances over a network (e.g., the Internet). Cloud computing may be utilized to run applications remotely using computer systems, such as a server or collection of servers to provision virtual machines used to execute an application (such as a distributed application) over a network. Cloud computing may allow for the pooling of hardware resources across computer systems allowing for on-demand access to hardware resources (e.g., CPU processing, GPU processing, data storage, bandwidth, etc.) to execute one or more services or applications. The applications may be deployed using virtual machines being executed on the remote hardware, with the hardware resources being provisioned on-demand. However, an issue with executing applications remotely on a cloud computer is that applications may require differing quantities of hardware resources as a function of the time. The hardware requirements may vary in complex patterns due to a variety of inputs, making it difficult to effectively scale allocation of resources as a function of time. For example, various applications executing on a cloud computing environment have differing levels of resource consumption over time. Some applications may work in a scheduled or batched manner, in which there is little or no resource demand followed by periods of maximum demand for resources. Other applications may exhibit a cyclical usage pattern cycling between periods of low resource demands to higher resource demands in regular or semi-regular intervals. Still other applications may follow a noncyclic resource usage as a function of time. Current approaches often scale an application according to instantaneous demand (e.g., autoscaling) is often inappropriate for allocating resources to distributed applications. Current approaches, such as autoscaling, may in some cases lead to over allocation of hardware resources, which may cause inefficiencies, and in other cases may lead to under allocation of hardware resources, which may cause slowdowns or potential errors in executing a respective distributed application.

Accordingly, a need exists for a system that can identify usage patterns for distributed applications, and automatically scale resource allocation with a scaling technique tailored to the determined usage pattern for the respective distributed application.

BRIEF SUMMARY

Certain disclosed embodiments provide systems and methods for allocating computational resources to a distributed application executed on virtual instances.

According to some embodiments, a system for allocating computational resources to a distributed application executed on virtual instances is disclosed. The system may include at least one processor and at least one memory having stored thereon computer program code, that when executed by the one or more processors, is configured to cause the processor to: receive usage metrics associated with a first application; determine whether the first application has a cyclic usage pattern, a batch usage pattern, or a non-cyclic usage pattern; select a scaling technique based on the determination; and automatically scale the first application with the selected scaling technique.

According to some embodiments, a system for allocating computational resources to a distributed application executed on a plurality of virtual machines is disclosed. The system may include at least one processor and at least one memory having stored thereon computer program code, that when executed by the one or more processors, is configured to cause the processor to: initiate a first plurality of virtual machine instances configured to execute a first distributed application; receive usage metrics associated with the first plurality of virtual machine instances executing the first distributed application; determine that at least one virtual machine should be added to the first plurality of virtual machines in response to a resource usage of the first plurality of virtual machine instances exceeding a maximum usage allocation; and determine that at least one virtual machine should be removed from the first plurality of virtual machines in response to a minimum usage allocation exceeding the resource usage of the first plurality of virtual machine instances.

According to some embodiments, a system for allocating computational resources to a distributed application executed on a plurality of virtual machines is disclosed. The system may include at least one processor and at least one memory having stored thereon computer program code, that when executed by the one or more processors, is configured to cause the processor to: receive usage metrics associated with a plurality of distributed applications; for each distributed application, determine a number of downstream applications associated with a respective distributed application; for each distributed application, determine the respective distributed application has a cyclic usage pattern, a batch usage pattern, or a non-cyclic usage pattern; for each distributed application having the cyclic usage pattern or the non-cyclic usage pattern, automatically scale a number of pre-allocated virtual instances in response to the number of downstream applications exceeding a predetermined threshold.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
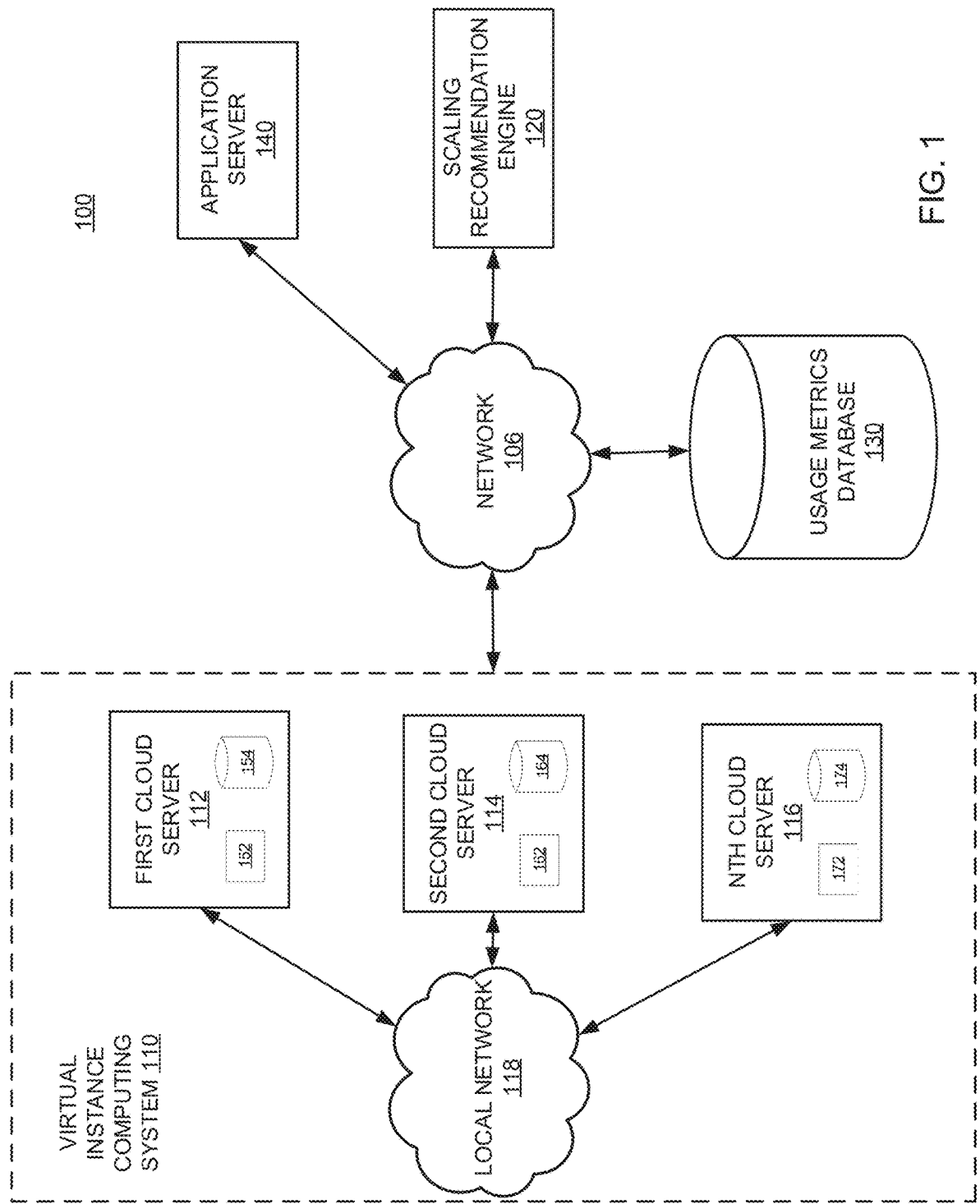
FIG. 1 is a diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to some embodiments, there are provided systems and methods allocating computational resources to distributed applications executed on a plurality of virtual instances. For example, in some embodiments, a system may receive usage metrics associated with an application, determine whether the application exhibits a cyclic usage pattern, a batch usage pattern, or a non-cyclic usage pattern, and select a scaling technique based on the determination. According to some embodiments, the system or method may include automatically scaling an application with the selected scaling technique.

Reference will now be made in detail to example embodiments of the disclosed technology, examples of which are illustrated in the accompanying drawings and disclosed herein. Wherever convenient, the same references numbers will be used throughout the drawings to refer to the same or like parts.

In accordance with certain disclosed embodiments, system environment 100 may include a virtual instance computing system 110 in communication with a scaling recommendation engine 120, a usage metrics database 130, and an application server 140 via network 106. scaling recommendation engine 120 may be a computing device, such as a mobile computing device (e.g., a smart phone, tablet computer, smart wearable device, portable laptop computer, voice command device, wearable augmented reality device, or other mobile computing device) or fixed computing device (e.g., desktop computer). An example architecture that may be used to implement one or more aspects of system 100 is described below with reference to FIG. 2.

Virtual instance computing system 110 may provide cloud computing services. For example, an organization (e.g., associated with scaling recommendation engine 120 and/or application server 140) may utilize virtual instance computing system 110 to execute a plurality of application distributed applications. Virtual instance computing system 110 may include a plurality of cloud servers (112, 114, 116), which include respective processors (152, 162, 172) and memories (154, 165, 174). The plurality of cloud servers 112, 114, 116 may be connected either directly, or through a network (e.g., local network 118). Local network 118 may be of any suitable type, including individual connections via the internet such as cellular or Wi-Fi networks. Each of the plurality of cloud servers 112, 114, 116 may execute one or more distributed applications of a plurality of distributed applications. For example, first cloud server 112 may execute a first distributed application, second cloud server 114 may execute a second distributed application, and nth cloud server 116 may execute an nth distributed application. The distributed applications may support business processes, and each cloud server may consist of a plurality of virtual instances. As resource demands shift over time for each distributed application, each cloud server (e.g., 112, 114, 116) may proactively scale hardware resources dedicated to executing each distributed application. In some cases, virtual instance computing system 110 communicates with usage metrics database 130 to provide usage metrics associated with resource demands placed on each respective cloud server (e.g., 112, 114, 116) executing a distributed application. According to some embodiments, the usage metrics may be collected and/or provided in real-time. Once the usage metrics are processed (as discussed in more detail below), virtual instance computing system 110 may receive instructions including a selected scaling technique and instructions to automatically scale resources allocated to a cloud server executing a respective distributed application, for example, from scaling recommendation engine 120. In response, virtual instance computing system 110 may increase or decrease the allotment of resources (e.g., servers, and/or virtual instances) executing the distributed applications.

Usage metrics database 130 may store usage metrics from virtual instance computing system 110. Scaling recommendation engine 120 may access the usage metrics stored in usage metrics database 130, and execute a predictive analysis (e.g., using one or more of rule-based platform 290 and/or machine learning model 295, described in more detail with respect to FIG. 2) to determine whether a respective distributed application exhibits a cyclic usage pattern, a non-cyclic usage pattern, or a batch usage pattern. In some cases, scaling recommendation engine 120 may utilize machine learning or modeling to determine the usage pattern. The selected scaling technique may be stored on application server 140.

Application server 140 may store each distributed application to be executed on virtual instance computing system 110. Application server 140 may also include a database that stores the relationship of each distributed application on other distributed applications executed on system 100. For example, a first distributed application may be interrelated with a second distributed application such that the output of the first distributed application is utilized in the execution of the second distributed application. Accordingly, application server 140 may include such interrelationships, and enable scaling recommendation engine 120 to determine the criticality of any given distributed application based in part on a number of "downstream" applications (e.g., distributed applications that rely on the output of another distributed application).

Network 106 may be of any suitable type, including individual connections via the internet such as cellular or Wi-Fi networks. In some embodiments, network 106 may connect terminals using direct connections such as radio-frequency identification (RFID), near-field communication (NFC), Bluetooth™, low-energy Bluetooth™ (BLE), Wi-Fi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

One of ordinary skill will recognize that various changes and modifications may be made to system environment 100 while remaining within the scope of the present disclosure. For example, in some cases, application server 140 may be implemented in "serverless" forms (e.g., executed within virtual instance computing system 110). Moreover, while the various components have been discussed as distinct elements, this is merely an example, and, in some cases, various elements may be combined into one or more physical or logical systems.

Figure 2:
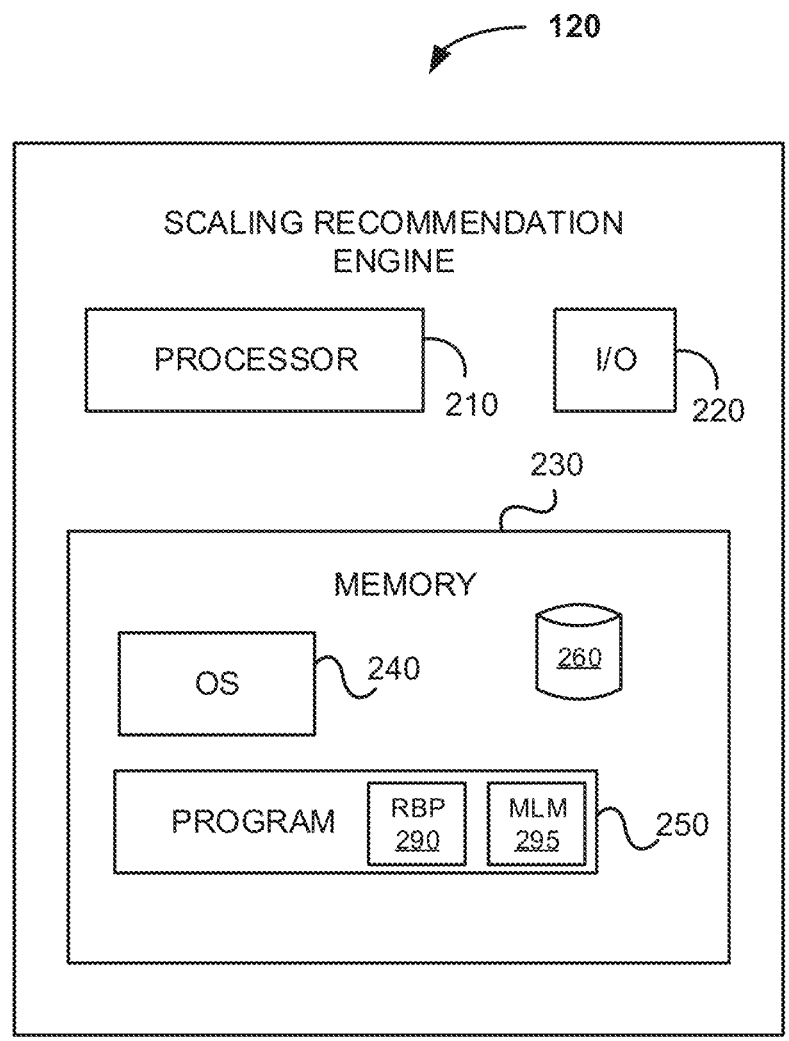
FIG. 2 is a block diagram of a scaling recommendation engine, according to an example embodiment.

FIG. 2 is a block diagram (with additional details) of the scaling recommendation engine 120, as also depicted in FIG. 1. According to some embodiments, the application server 140, usage metrics database 130, and/or each cloud sever (e.g., 112, 114, 116), as depicted in FIG. 1, may have a similar structure and components that are similar to those described with respect to scaling recommendation engine 120 shown in FIG. 2. As shown, the scaling recommendation engine 120 may include a processor 210, an input/output ("I/O") device 220, a memory 230 containing an operating system ("OS") 240 and a program 250. In certain example implementations, the scaling recommendation engine 120 may be a single server or may be configured as a distributed computer system including multiple servers or computers that interoperate to perform one or more of the processes and functionalities associated with the disclosed embodiments. In some embodiments, the scaling recommendation engine 120 may further include a peripheral interface, a transceiver, a mobile network interface in communication with the processor 210, a bus configured to facilitate communication between the various components of the scaling recommendation engine 120, and a power source configured to power one or more components of the scaling recommendation engine 120.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the scaling recommendation engine 120 may include one or more storage devices configured to store information used by the processor 210 (or other components) to perform certain functions related to the disclosed embodiments. In one example, the scaling recommendation engine 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the scaling recommendation engine 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the scaling recommendation engine 120 may include the memory 230 that may include one or more programs 250 to perform one or more functions of the disclosed embodiments. For example, in some embodiments, the scaling recommendation engine 120 may additionally manage dialogue and/or other interactions with the user via a program 250.

In certain example implementations, the program 250 that may include a rule-based platform 290 for determining whether a respective distributed application exhibits a cyclic usage pattern, a non-cyclic usage pattern, or a batch usage pattern in response to analyzing the received usage metrics (e.g., metrics stored in usage metrics database 130) using a set of predefined rules. In some embodiments, the scaling recommendation engine 120 may include a trained machine learning model 295 for determining whether a respective distributed application exhibits a cyclic usage pattern, a non-cyclic usage pattern, or a batch usage pattern in response to analyzing the received usage metrics, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the rule-based platform 290 or the trained machine learning model 295), that, when executed, perform functions related to disclosed embodiments.

According to some embodiments, the system may determine whether a respective distributive application exhibits a cyclic usage pattern, a non-cyclic usage pattern, or a batch usage pattern in response to determining (e.g., via rule-based platform 290) the type of application that is being implemented by the distributed system. In some embodiments, the system may analyze the usage metrics and determine whether a respective distributed application exhibits a batch usage pattern or a non-batch (e.g., cyclic or non-cyclic) usage pattern based in part on the type of activity exhibited in the usage metrics. For example, predictable spikes in usage at regular intervals, followed by periods of relative inactivity may indicate to the system that the respective distributed application exhibits a batch-usage pattern. If the usage metrics do not exhibit regularly spaced spikes of activity separated by periods of non-activity, the system may determine that the distributed application exhibits one of a cyclic or non-cyclic usage pattern, depending on other characteristics of the usage metrics. In some embodiments, the system may determine whether a respective distributed application corresponds to a quality assurance implementation (e.g., non-public, inward facing) of a distributed application, or a production version implementation (e.g., client/user/customer facing) of the distributed application. The system may utilize one of rule-based platform 290 and/or machine learning model 295 to determine the usage pattern of the respective distributed application based on its status as either a production implementation or a quality assurance ("QA") implementation. In some embodiments, quality assurance implementations may exhibit a non-cyclic usage pattern or batch-usage pattern, whereas, a production implementation may exhibit a cyclic-usage pattern or a batch-usage pattern.

According to some embodiments, an appropriate scaling technique may be selected based in part on the type of load caused by the respective distributed application. For example, the system may recommend different scaling techniques based on the type of load indicated by the usage metrics for a respective distributed application. The system may determine that the distributed application is causing a virtual instance (e.g., first cloud server 112, second cloud server 114, and/or nth cloud server 116) to utilize close to 100% of the CPU processing power available to the respective cloud server. In such instances, the system may determine that the applicable scaling technique is one that allocates additional virtual instances to the first cloud server. Accordingly, the system may provisionally add additional "virtual" CPU cores to the respective cloud server, reducing the overall CPU usage and allowing the distributed application to be maintained regardless of CPU resource spikes. In another instance, the system may determine that the distributed application is causing a virtual instance (e.g., first cloud server 112, second cloud server 114, and/or nth cloud server 116) to utilize close to 100% of the available memory (e.g., RAM) available to the respective cloud server. In such instances, the system may determine that the applicable scaling technique that allocates additional memory resources to the virtual instance without scaling up with number of virtual instances assigned to the respective distributed application. Accordingly, the system may provisionally add additional memory (RAM) allocation to the respective cloud server, reducing the overall memory usage and allowing the distributed application to be maintained regardless of spikes in memory usage.

According to some embodiments, the system may determine an appropriate scaling technique based on whether the usage metrics indicate predictable or unpredictable usage patterns. For example, the system may determine that a respective distributed application corresponds to a non-cyclic usage pattern based on determining that the usage metrics indicate an unpredictable usage pattern. Similarly, the system may determine that the usage metrics indicate a predictable usage pattern. According to some embodiments, when the system determines that the usage metrics indicate a predictable usage pattern, the system may implement an autoregressive integrated moving average model (ARIMA) to predict a future load pattern, and accordingly select a scaling technique based on the predicted future load pattern.

According to some embodiments, the system may determine a scaling technique to use for a distributed application based on analyzing the usage metrics (e.g., usage metrics stored on usage metrics database 130). The system may implement one or more of the following techniques, although additional scaling techniques are not precluded: (i) target tracking scaling techniques, (ii) "prewarmed" scaling techniques, (iii) scheduling scaling techniques, and/or (iv) predictive scaling techniques.

Target tracking scaling may involve setting a target policy to keep one or more usage statistics at a consistent rate of utilization. For example, target tracking scaling may involve selecting an aggregate CPU utilization (or any other metric) to target over time for a respective distributed application. Target tracking may allow for the distributed application to be scaled based on current usage and past usage, but does not attempt to predict future use and proactively scale resources based upon a prediction.

Prewarmed scaling involves determining that a predicted usage spike (e.g., based on known cyclic usage patterns, and/or predicted using a predictive scaling technique) will exceed the allocated resources dedicated to a respective distributed application. Accordingly, the system may pre-allocate additional resources in standby by initializing one or more additional virtual instances with a copy of the distributed application to be scaled. When the resource usage spikes, these "prewarmed" virtual instances may be fully initialized and ready to absorb some or all of the resource demands placed on the distributed application.

Scheduled scaling techniques may be beneficial to automatically scale distributed applications that exhibit a batch usage pattern. For example, a given distributed application may exhibit a high demand in resources weekly on Mondays between 5 pm and 7 pm eastern time. Accordingly, the system may schedule additional computational resources (e.g., virtual instances) to be allocated to execute the given distributed application during Mondays between 5 pm and 7 pm. According to some embodiments, scheduled scaling techniques may also be utilized to scale a distributed application exhibiting a cyclic usage pattern.

Predictive scaling techniques may be used to proactively determine a future resource usage level based on past distributed application usage metrics. Predictive scaling may utilize the received usage metrics (e.g., metrics stored on usage metrics database 130) to predict future usage. The system may utilize the machine learning model (e.g., machine learning model 295) to generate predictions of future use over time. Predictive scaling techniques may be advantageous because they can help the system avoid over-provisioning resources to a given distributed application, saving valuable computational power and resource costs. According to some embodiments, predictive scaling techniques may operate to set a minimum usage allocation, as described in more detail with respect to FIG. 5.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the scaling recommendation engine 120 to perform one or more of the processes and functionalities associated with the disclosed embodiments.

Database 260 may include stored data relating to each distributed application being executed on virtual instance computing system 110. Database 260, according to some embodiments, may store information related to usage metrics which are stored by usage metrics database 130 in other embodiments. In some embodiments, database 260 may also include, for each distributed application, information related to applications "downstream" from a respective distributed application, which may be obtained from application server 140 according to some embodiments.

The scaling recommendation engine 120 may also be communicatively connected to one or more memory devices (e.g., databases) locally or through a network. The remote memory devices may be configured to store information and may be accessed and/or managed by the scaling recommendation engine 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The scaling recommendation engine 120 may also include one or more I/O devices 220 that may comprise one or more interfaces for receiving signals or input from devices and providing signals or output to one or more devices that allow data to be received and/or transmitted by the scaling recommendation engine 120. For example, the scaling recommendation engine 120 may include interface components, which may provide interfaces to one or more input devices, such as one or more keyboards, mouse devices, touch screens, track pads, trackballs, scroll wheels, digital cameras, microphones, sensors, and the like, that enable the scaling recommendation engine 120 to receive data from one or more cloud servers (such as, for example, cloud server(s) 112, 114, and/or 116).

In example embodiments of the disclosed technology, the scaling recommendation engine 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the scaling recommendation engine 120 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the scaling recommendation engine 120 may include a greater or lesser number of components than those illustrated.

Figure 3:
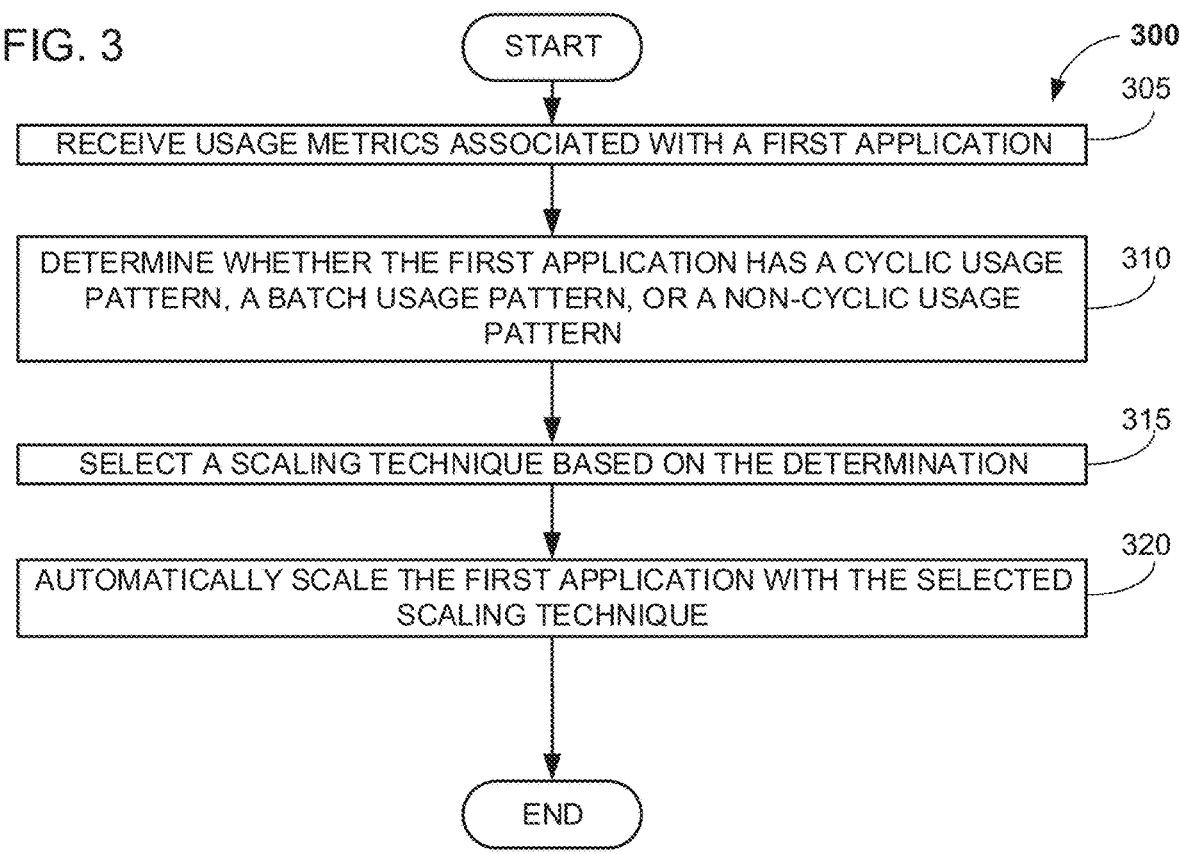
FIG. 3 is a flowchart of a method of automatically selecting a scaling technique for allocating computational resources to a distributed application executed on virtual instances, according to certain example embodiments.

FIG. 3 is a flowchart 300 of a method of automatically selected a scaling technique for allocating computational resources to a distributed application executed on virtual instances, according to certain example embodiments. Referring to FIG. 3, a system (e.g., usage metrics database 130) may receive usage metrics associated with a first distributed application from the virtual instance computing system 110 in block 305. For example, an organization may store a plurality of distributed applications to be executed on virtual instances on an application server (e.g., application server 140). The organization may upload copies of the distributed applications to the virtual instance computing system 110. Each distributed application may be executed on one of a plurality of cloud servers (e.g., 112, 114, 116). The virtual instance computing system 110 may monitor hardware resources being used by each virtual instance of virtual instance computing system 110 in real-time, and provide the usage metrics to usage metrics database 130, which may be stored as a function of time. Usage metrics may include statistics associated with hardware resources used as a function of time (e.g., CPU power, memory allocation, GPU power, number of virtual instances/servers, number of transactions per second, disk input/output over time, etc.), although other usage metrics are not precluded.

In block 310, the system (e.g., scaling recommendation engine 120) may determine whether the first application has a cyclic usage pattern, a batch usage pattern, or a non-cyclic usage pattern based on the received usage metrics. For example, the scaling recommendation engine 120 may access the usage metrics stored on usage metrics database 130 and may use one or more of a rule-based platform (e.g., rule-based platform 290) and/or a trained machine learning model (e.g., machine learning model 295) to extract patterns of hardware resource usage as a function of time. According to some embodiments, the analysis may include transforming the usage metrics from a time domain into a frequency domain to determine whether a respective distributed application has a cyclic or non-cyclic usage pattern of hardware resources. For example, the system may determine that a respective distributed application demands hardware resources in regular predictable intervals, but only for select periods of time during which the hardware demands quickly rise from no resource use to a maximum threshold of hardware usage. When the system determines that the distributed application has such a usage pattern, the system (e.g., scaling recommendation engine 120) may determine that the respective distributed application exhibits a batch usage pattern. According to some aspects of the disclosure, the system may utilize multiple scaling techniques to dynamically scale allocated resources to a distributed application. For example, in some cases, the system may determine that additional computational resources are required for operation of a respective distributed application, but the "warm up time" associated with launching the distributed application on a "cold" virtual instance (e.g., first cloud server 112, second cloud server 114, and/or nth cloud server 116) may cause the distributed application to face capacity constraints. Accordingly, and as further described with respect to FIG. 8, the system may utilize "prewarmed" virtual instances that have been pre-initialized to execute the distributed application ahead of an actual demand spike. When there is enough time to meet the computational needs of a distributed application without using a "prewarmed" virtual instance, the scaling technique may be known as target tracking, in which, a future resource requirement is determined and the resources are automatically scaled with a "target tracking" scaling technique which does not utilize "prewarmed" virtual instances, but rather involves initializing "cold" virtual instances to execute the distributed application when a future resource usage exceeds the current allotted maximum computational resources.

In another example, the system (e.g., scaling recommendation engine 120) may segment the usage metrics into time interval segments and may analyze each block independently. The system may correlate hardware resource demands over the time interval segments, and accordingly, may determine that the usage pattern for the first distributed application has a cyclic usage pattern. For example, the system may determine that the resource demands are at a minimum allocation between 6 pm and 6 am every weekday, and steadily rise between 6 am to 4 pm to a maximum resource allocation, and fall back down to a minimum resource allocation between 4 pm and 6 pm. The system may additionally determine that the first application exhibits a minimal usage during weekends based on the segmentation of usage statistics recorded on the usage metrics database 130. In yet another example, the system (e.g., scaling recommendation engine 120) may determine that the first application exhibits a non-cyclic usage pattern. For example, the system may segment the usage metrics stored on usage metrics database 130, and analyze each time segment to determine whether there is a recurring hardware resource cycle indicated by the usage metrics. If scaling recommendation engine 120 determines that the time segmented usage metrics do not indicate a cyclical usage pattern or a batch usage pattern, the system may determine that the first application exhibits a non-cyclic usage pattern. If scaling recommendation engine 120 identifies that the time segmented usage metrics exhibit periodic sequences of maximal use followed by periods of no hardware resource use by a respective distributed application, the system may determine that the respective distributed application exhibits a batch usage pattern. According to some embodiments, the system (e.g., scaling recommendation engine 120) may additionally determine resource usage gradients based on the usage metrics stored on usage metrics database 130. For example, the system may calculate a gradient based on any variable indicative of resource usage (e.g., CPU usage, GPU usage, memory usage, number of virtual instances allocated to an application, etc.). The calculated gradient may be an instantaneous gradient (e.g., a rate of change of resource usage over a small period of time) or, in some embodiments, the calculated gradient may be an average gradient (e.g., an average rate of change of resource usage over a larger period of time). According to some embodiments, the system may calculate a usage gradient for each segment of the usage metrics stored on usage metrics database 130 and may determine the usage pattern of a respective distributed application based at least in part on the determined usage gradient. According to some embodiments, the system (e.g., scaling recommendation engine 120) may further determine, based on the usage metrics stored on usage metrics database 130, a minimum resource usage value and a maximum resource value for each distributed application. In some embodiments, minimum resource usage values and maximum resource usage values may be calculated for multiple segmented time periods based on the usage metrics stored on usage metrics database 130, while in other embodiments, the minimum and maximum usage values may be calculated for the entire time period of usage metrics available for a respective distributed application.

In block 315, the system (e.g., scaling recommendation engine 120) may select a scaling technique based on determining a usage pattern for the first distributed application. In some embodiments, the selected scaling technique may include multiple scaling techniques being used in tandem. The selected scaling techniques, may include, for example, one or more of (i) target tracking scaling techniques, (ii) "prewarmed" scaling techniques, (iii) scheduling scaling techniques, and/or (iv) predictive scaling techniques. For example, the scaling recommendation engine 120 may transmit instructions to virtual instance computing system 110 to allocate more virtual servers (e.g., cloud servers 112, 114, 116) to a respective distributed application, or the scaling recommendation engine 120 may transmit instructions to virtual instance computing system 110 to allocate more hardware resources to a virtual server (e.g., cloud server 112, 114, 116) running a respective distributed application. In some embodiments, the scaling recommendation engine 120 may transmit instructions to virtual instance computing system 110 to pre-allocate one or more "prewarmed" virtual instances to a respective distributive application based on identifying a likelihood of a spike in resource demands from the usage metrics stored on usage metrics database 130. Preallocated virtual instances may be virtual environments that are preemptively "warmed-up" and ready to be initialized to execute a respective distributed application in response to resource demands suddenly spiking. The system may preemptively identify a distributed application having a likelihood of a resource demand spike at a future time and pre-allocate one or more warmed-up (e.g., initialized) virtual instances that can immediately be utilized by the distributed application when its resource demand spikes beyond what the allocated virtual instances can handle. Such a scaling technique may be referred to as a prewarming scaling technique, and may be advantageous to apply to distributed applications exhibiting a non-cyclic usage pattern. Because non-cyclic usage patterns are less predictable than cyclic usage patterns and batch usage patterns, the system may apply a prewarming scaling technique to ensure that resource demands are satisfied in case of a sudden spike in hardware utilization for a given distributed application, by having resources (e.g., additional virtual instances) ramped up and ready to share in the workload.

Figure 8:
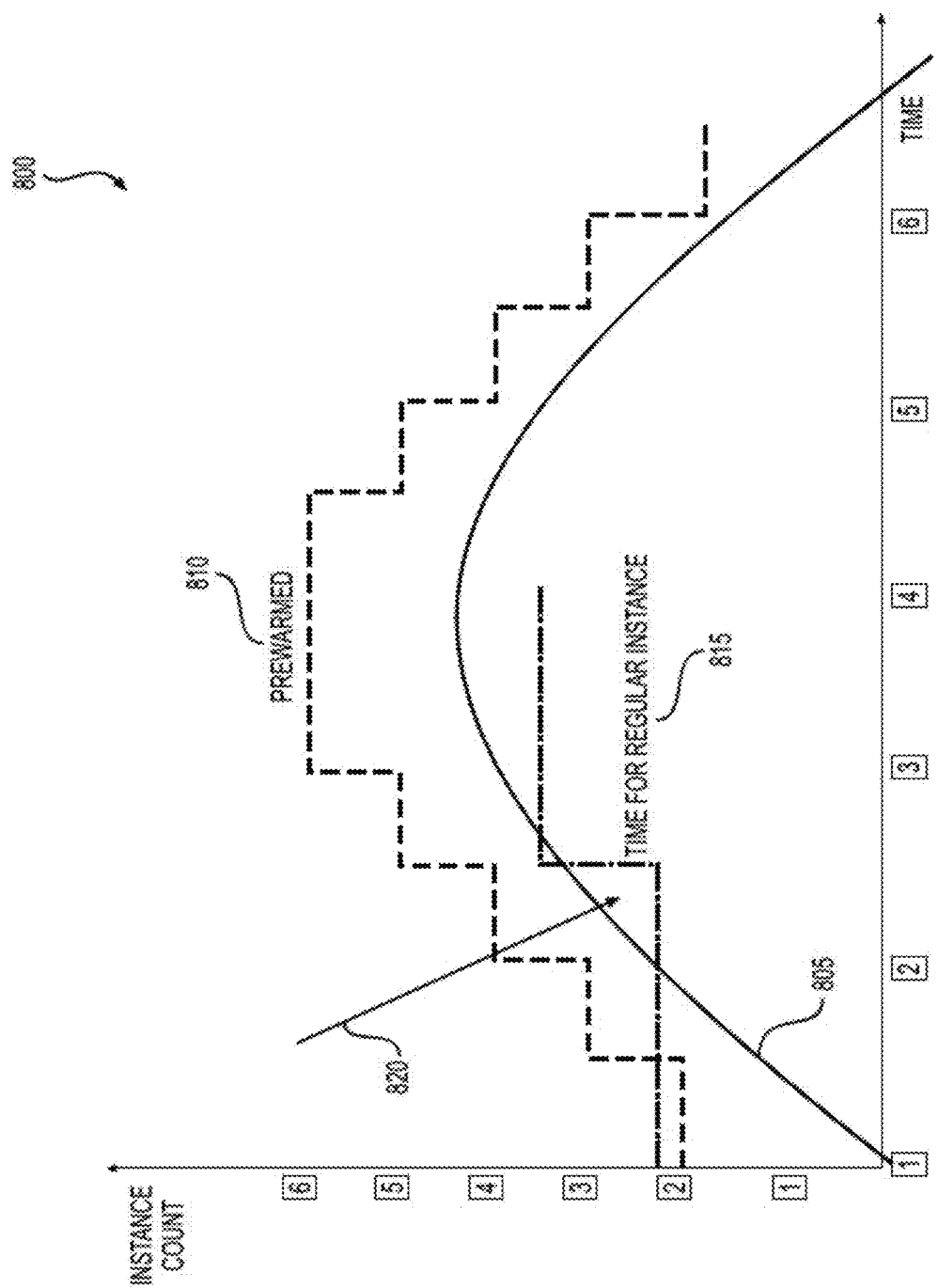
FIG. 8 is a diagram representing the applicability of various scaling techniques as a function of warmup time associated with a respective distributed application, according to certain example embodiments.

According to some embodiments, and as described more fully with respect to FIG. 8, the system may select a "prewarmed" scaling technique for a distributed application exhibiting a cyclic usage pattern when the initialization time for initializing a "cold" virtual instance would be too long to allow the system to effectively scale resources. For example, cyclic loads may not exhibit a pure sine wave pattern. Even cyclic loads may exhibit usage spikes on top of, or in addition to, an underlying cyclic pattern. Accordingly, the system may use a combination of "prewarmed" resource allocation scaling techniques and "target tracking" resource allocation techniques that only use less expensive "cold" virtual instances.

In some embodiments, selecting a prewarming scaling technique may also be based in part on a determined warmup time associated with scaling the respective distributed application with additional virtual instances. When the warmup time associated with initializing one or more virtual instances exceeds a predetermined threshold, scaling recommendation engine 120 may preemptively preallocate one or more virtual instances to a distributed application using a prewarmed scaling technique.

According to some embodiments, when the system (e.g., scaling recommendation engine 120) determines that the distributed application has a batch usage pattern, scaling recommendation engine 120 may scale the virtual instances allocated to the first distributed application according to a scheduled scaling technique. For example, if the system determines that the first distributed application exhibits usage demands in regular intervals once weekly at a specified time (e.g., Thursdays between 6 pm and 8 pm EST), the system (e.g., scaling recommendation engine 120) may transmit instructions to virtual instance computing system 110 to proactively allocate a number of virtual instances to the first distributed application based on the maximum usage as determined by the analysis of the usage metrics stored on usage metrics database 130. According to some embodiments, the system may proactively allocate more virtual instances than the maximum calculated usage by a predetermined safety margin factor. Accordingly, if the resource usage during the first distributed application exceeds the norm for any time period, the margin factor will ensure that no slowdowns or loss of information occurs when executing the first distributed application.

According to some embodiments, when the system (e.g., scaling recommendation engine 120) determines that the distributed application exhibits a cyclic usage pattern, scaling recommendation engine 120 may scale the virtual instances allocated to the first distributed application according to a dynamic scaling technique. For example, a scaling recommendation engine may segment the usage metrics stored on usage metrics database 130, and evaluate each segment of the usage metrics to determine local minimum usage and maximum usages. In some embodiments, the system may identify the highest maximum usage among every time segment and the minimum usage among every segment, and dynamically scale resources to be allocated to the first distributed application to range from the identified minimum usage and maximum usage. In some embodiments, the system may allocate additional hardware resources according to a predetermined margin factor, in order to ensure there are no slowdowns or loss of data due to the first distributed application exceeding a maximum allotted hardware resource allocation. In some embodiments, the dynamic scaling technique may be based on the gradient curve associated with each cycle of the cyclic usage pattern. For example, if the system determines that the cyclic usage pattern repeats daily, with a local minimum coinciding with approximately 3 AM eastern time, and gradually rises to a maximum usage at 3 PM eastern time, scaling recommendation engine 120 may instruct virtual instance computing system 110 to allocate a minimum threshold of hardware resources at 3 AM with a gradual ramp up to a maximum threshold of hardware resources to be available to coincide with peak usage at 3 PM. In some embodiments, a margin factor may be implemented to ensure that allocated resources are sufficient in the case of a sudden spike in demand associated with the distributed application. In block 320 the system (e.g., scaling recommendation engine 120) may automatically scale the first application with the selected scaling technique, as described above.

Figure 4:
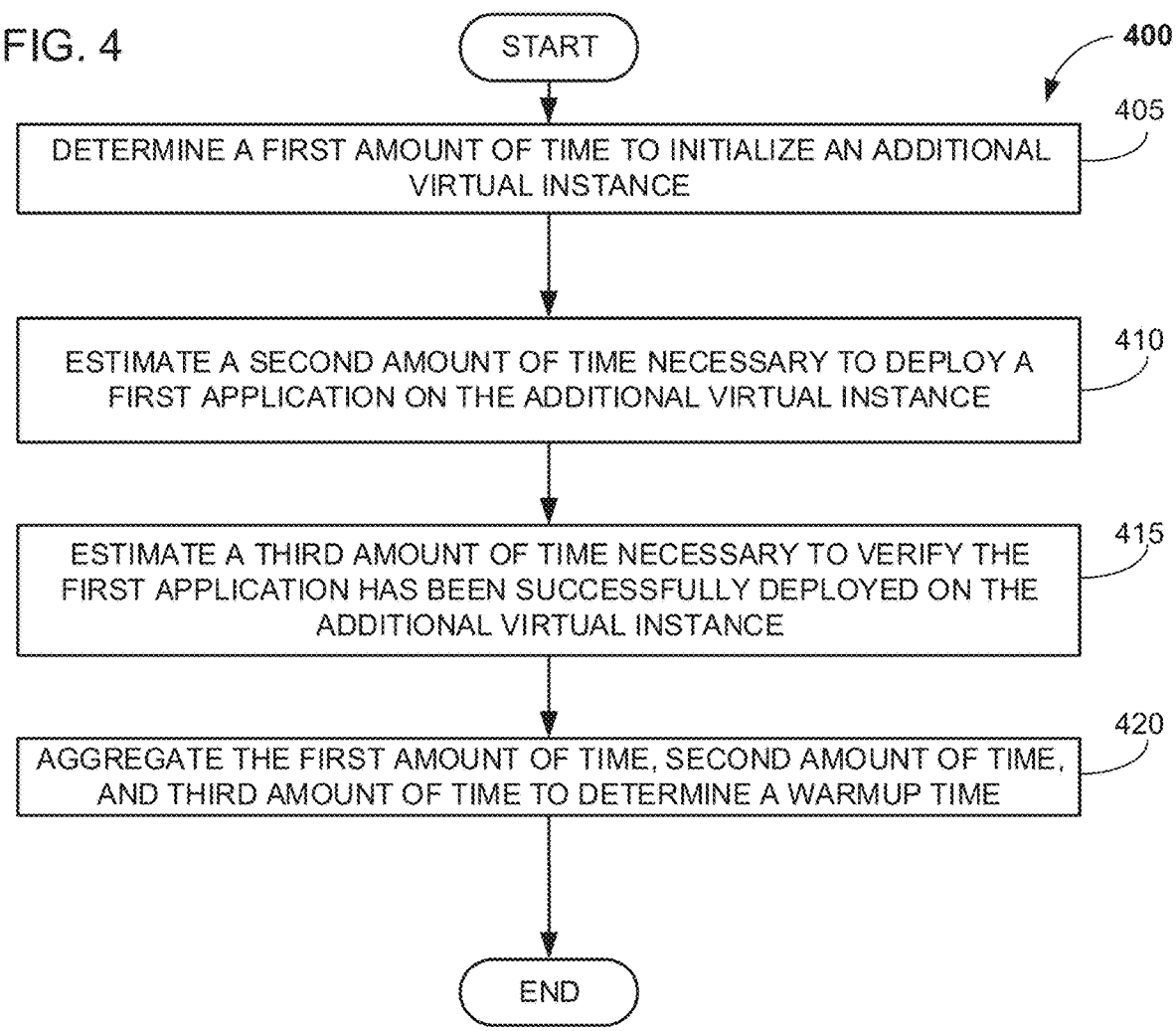
FIG. 4 is a flowchart of a method of determining warmup time associated with a virtual instance, according to certain example embodiments.

FIG. 4 is a flowchart of a method of determining warmup time associated with a virtual instance, according to certain example embodiments. For example, in some embodiments, the system may pre-allocate one or more virtual instances in a prewarmed state to accommodate a potential spike in demand for hardware resources. The system may determine a warmup time associated with initializing one or more virtual instances to execute a respective distributed application, and when the warmup time exceeds a predetermined threshold, pre-allocate one or more virtual instances to executing the respective distributed application. As shown in FIG. 4, in block 405, the system (e.g., virtual instance computing system 110 and/or scaling recommendation engine 120) may determine a first amount of time necessary to initialize an additional virtual instance to execute a respective distributed application. For example, the initialization time may be associated with the time it takes for virtual instance computing system 110 to spin up an additional server or computing system to be a part of first cloud server 112, second cloud server 114, and/or nth cloud server 116. In block 410, the system (e.g., virtual instance computing system 110 and/or scaling recommendation engine 120) may estimate a second amount of time necessary to deploy a first application on the additional virtual instance. In some instances, the amount of time necessary to deploy the first application may be determined based on querying application server 140. In some instances, the amount of time necessary to deploy the first application may be determined by deploying the first application on a virtual instance and calculating the amount of time that elapses between the command issued to deploy the first application and when the first application is effectively deployed. In block 415, the system may estimate a third amount of time necessary to verify the first application has been successfully deployed on the additional virtual instance. For example, application server 140 may query virtual instance computing system 110 to verify whether the deployment of the first application has successfully deployed. The verification may include comparing the virtualized instanced of the first application executing on the virtual instance computing system 110 to a stored copy of the first application on application server 140. In some embodiments, the verification may include comparing a checksum or hash value stored on application server 140 associated with the first application to a checksum or hash value calculated by virtual instance computing system 110 in response to deploying the first application on a respective cloud server. In some embodiments, the verification may include executing a "health check" function of the first application. The health check function may involve determining one or more of (i) an overall user satisfaction for the application, (ii) latency associated with the operation of the application, (iii) verification of usage metrics (e.g., usage metrics stored on usage metrics database 130), (iv) error rates associated with the execution of the application, (v) CPU and/or disk usage, and/or (vi) total "uptime" or application availability over a predetermined period of time. In block 420, the system may determine the warmup time by aggregating the first amount of time, the second amount of time, and the third amount of time.

Figure 5:
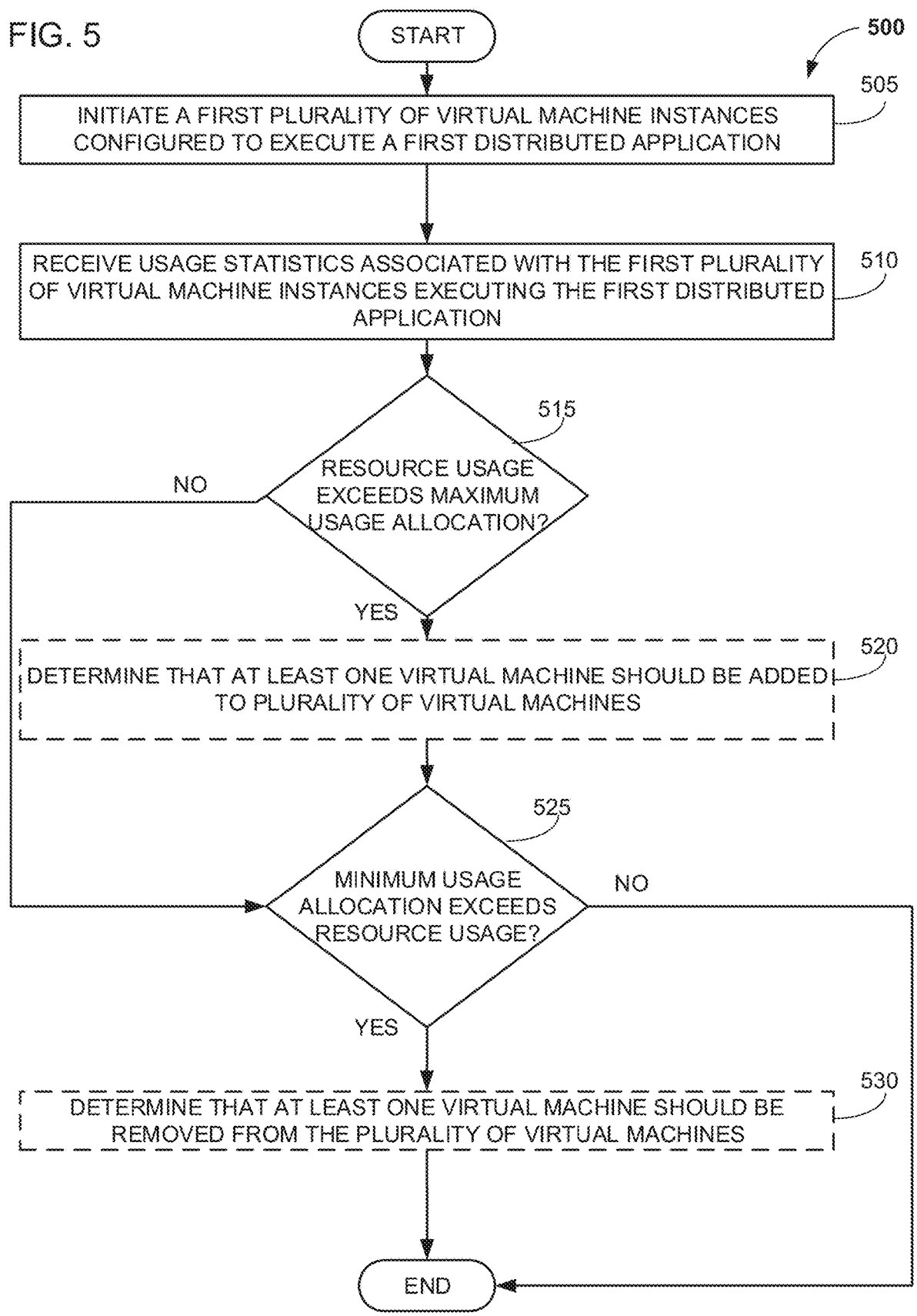
FIG. 5 is a flowchart of a method of allocating computational resources to a distributed application executed on virtual instances, according to certain example embodiments.

FIG. 5 is a flowchart of a method of allocating computational resources to a distributed application executed on virtual instances, according to certain example embodiments. According to some embodiments, the system may modify one or more of a maximum resource allocation or a minimum resource allocation in response to determining that a determined maximum usage exceeds the maximum resource allocation and/or determining that the minimum resource allocation exceeds the minimum resource usage. In block 505, the system may initiate a first plurality of virtual machine instances configured to execute a first distributed application. In block 510, the system may receive usage statistics associated with the first plurality of virtual machine instances (e.g., cloud servers 112, 114, or 116) executing the first distributed application. The usage statistics may be stored on usage metrics database 130. In decision block 515, the system may determine whether the usage metrics indicate that the resource usage exceeds a maximum resource usage allocation. For example, application server 140 may store maximum and minimum resource usage allocations to be provided for reach distributed application to be executed on virtual instance computing system 110. The system (e.g., scaling recommendation engine 120) may compare the maximum and minimum resource allocation for the first distributed application to the actual usage metrics received by the usage metrics database 130. When the resource usage exceeds the maximum resource usage allocation, the system may determine that at least one virtual machine should be added to the plurality of virtual machines executing the first distributed application. Accordingly, scaling recommendation engine 120 may transmit instructions to virtual instance computing system 110 to add at least one virtual machine (e.g., cloud sever) to the plurality of virtual machines executing the first distributed application in block 520. In decision block 525, the system may determine whether the usage metrics indicate that the minimum usage allocation exceeds a minimum resource usage. As described above, the system (e.g., scaling recommendation engine 120) may compare the minimum resource allocation for the first distributed application to the usage metrics received by the usage metrics database 130. When the minimum usage allocation exceeds a minimum resource usage indicated by the usage metrics, the system may determine that at least one virtual machine should be removed from the plurality of virtual machines executing the first distributed application. Accordingly, scaling recommendation engine 120 may transmit instructions to virtual instance computing system 110 to remove at least one virtual machine (e.g., cloud server) from the plurality of virtual machines executing the first distributed application in block 530.

Figure 6:
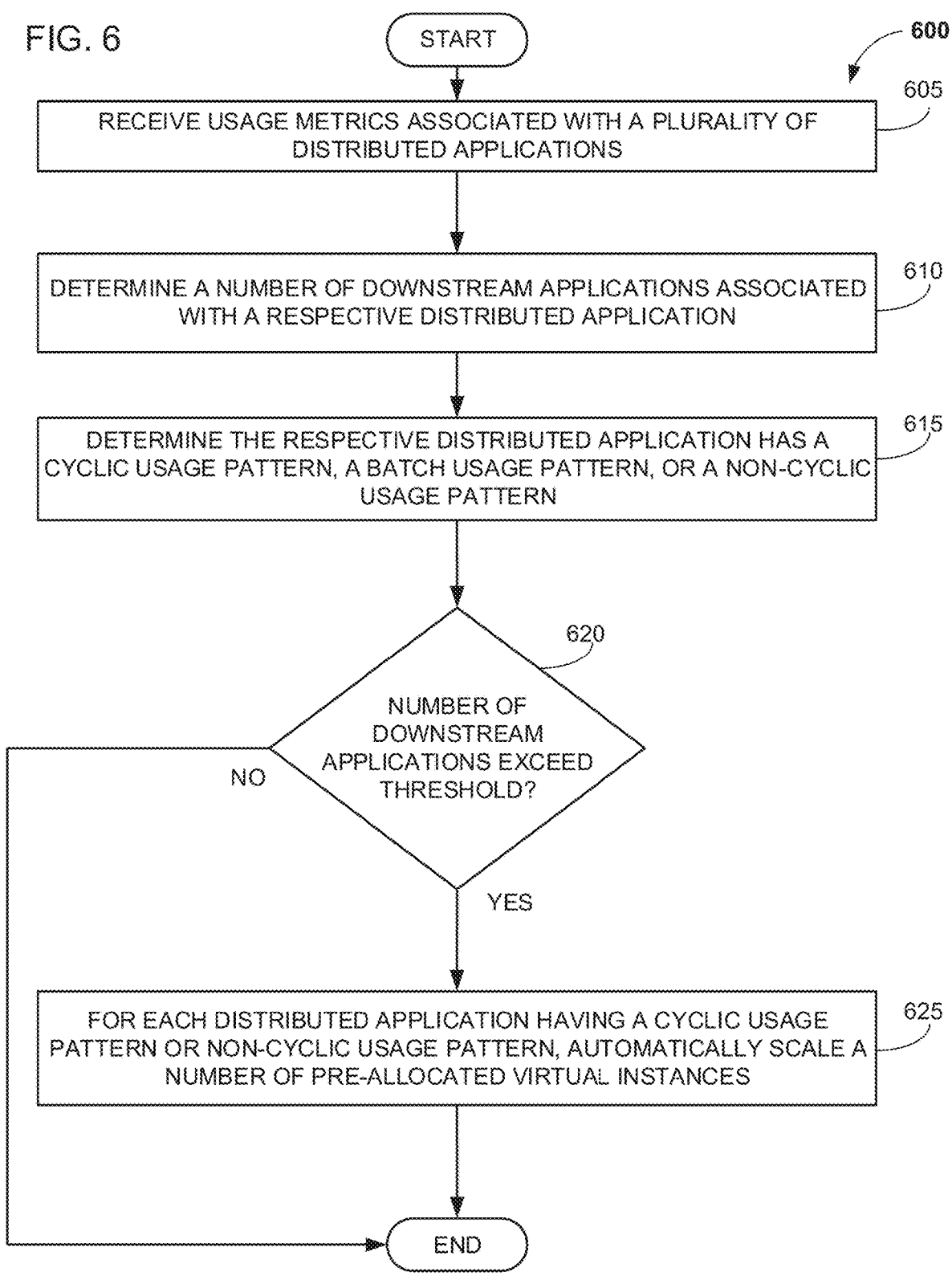
FIG. 6 is a flowchart of a method of allocating computational resources to a distributed application executed on virtual instances based on a number of downstream distributed applications, according to certain example embodiments.

FIG. 6 is a flowchart of a method of allocating computational resources to a distributed application executed on virtual instances based on a number of downstream distributed applications, according to certain example embodiments. According to some embodiments, the system may determine whether a distributed application exhibits a cyclic usage pattern, a batch usage pattern, or a non-cyclic usage pattern, and additionally determine a number of "downstream" applications that rely on the output of the distributed application. Based on these determinations, the system may automatically scale a number of pre-allocated (e.g., pre-warmed) virtual instances using one or more of (i) target tracking scaling techniques, (ii) "prewarmed" scaling techniques, (iii) scheduling scaling techniques, and/or (iv) predictive scaling techniques. In block 605, the system may receive usage metrics associated with a plurality of distributed applications. The usage metrics may be stored on usage metrics database 130. In block 610, the system (e.g., scaling recommendation engine 120) may determine a number of downstream applications associated with a respective distributed application. For example, a first distributed application may be interconnected with a second distributed application, a third distributed application, etc., such that an output of the first distributed application becomes an input to the second distributed application, third distributed application, etc. According to some embodiments, scaling recommendation engine 120 may query application server 140 to determine the relationships between the plurality of distributed applications being executed on virtual instance computing system 110. In block 615, the system (e.g., scaling recommendation engine 120) may determine a usage pattern associated with the first application. For example, the system may determine whether the first distributed application exhibits a cyclic usage pattern, a non-cyclic usage pattern, or a batch usage pattern. Block 615 is substantially similar block 310 as discussed with respect to FIG. 3, and a full description is omitted here for brevity. In decision block 620, the system (e.g., scaling recommendation engine 120) may determine whether the number of downstream applications for the first application exceed a predetermined threshold. When the number of downstream applications for the first distributed application exceeds a predetermined threshold, the method may move to block 625, otherwise the method may end. In block 625, for each distributed application having a cyclic usage pattern or a non-cyclic usage pattern, the system may automatically scale a number of pre-allocated virtual instances. Automatically scaling a number of pre-allocated virtual instances may be similar to allocating prewarmed virtual instances as discussed with respect to FIGS. 3-4. According to some embodiments, pre-allocating virtual instances may be executed only for distributed applications having a cyclic or non-cyclic usage patterns, because distributed applications exhibiting a batch usage pattern have resource usage demands that are more predictable and, in some embodiments, do not need resource scaling. However, in other embodiments, the system may perform the scaling of block 625 for any distributed application that has a number of downstream applications exceeding the predetermined threshold, regardless of the type of usage pattern that the distributed application exhibits.

According to some embodiments, automatically scaling a number of virtual instances, may include at least two components. For example, the system may determine an operating range including (i) a minimum resource allocation and a (ii) maximum resource allocation as described in more detail with respect to FIG. 5. The system may additionally determine (e.g., using a target tracking scaling technique) a target resource usage that may be a value between the determined minimum resource allocation and the maximum resource allocation. In some embodiments, a minimum resource allocation may be associated with a number of "prewarmed" instances kept in reserve for executing a respective distributed application. For example, the system may set a minimum resource allocation that requires an upstream distributed application to include a set number of "prewarmed" instances to handle spikes in load based at least in part on a number of downstream applications exceeding a threshold value. Accordingly, demand spikes caused by one or more downstream applications may be proactively managed by the system.

Figure 7:
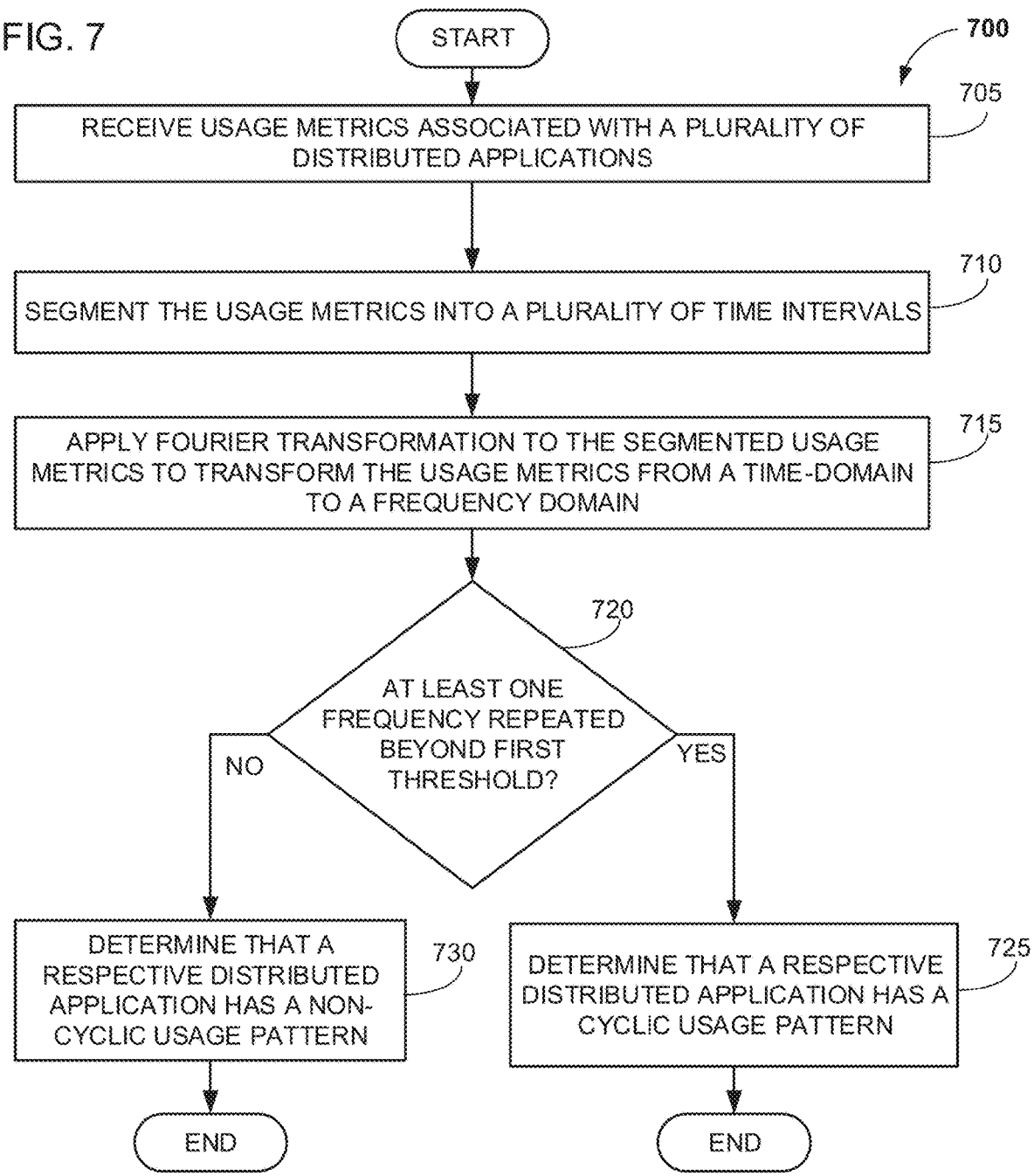
FIG. 7 is a flowchart of a method of determining whether a respective distributed application exhibits a cyclic usage pattern or a non-cyclic usage pattern, according to certain example embodiments.

FIG. 7 is a flowchart of a method of determining whether a respective distributed application exhibits a cyclic usage pattern or a non-cyclic usage pattern, according to certain example embodiments. According to some embodiments, method 700 may be applicable to a distributed application which the system has already determined does not exhibit a batch usage pattern. In block 705, the system may receive usage metrics associated with a plurality of distributed applications. In block 710, the system (e.g., scaling recommendation engine 120) may segment the usage metrics into a plurality of time intervals or time segments (e.g., as described in more detail with respect to FIG. 3). In block 715, the system may apply a Fourier transformation to the segmented usage metrics to transform the usage metrics from a time-domain into a frequency domain. The system may utilize any number of Fourier transformations, including a fast Fourier transformation, a discrete Fourier transformation, and/or a short time Fourier transformation. In some embodiments, the system may use a discrete cosine transformation to transform the usage metrics from a time-domain into the frequency domain. In decision block 720, the system may determine whether at least one frequency is repeated beyond a first threshold. When at least one frequency is not repeated beyond a first threshold, the method may move to block 730, and when at least one frequency is repeated beyond the first threshold, the method may move to block 725. In block 725, in response to at least one frequency repeated beyond the first threshold in the transformed usage metrics, the system may determine that a respective distributed application exhibits a cyclic usage pattern. In block 730, in response to no frequencies repeated beyond the first threshold in the transformed usage metrics, the system may determine that the respective distributed application has a non-cyclic usage pattern.

FIG. 8 is a diagram representing the applicability of various scaling techniques as a function of warmup time associated with a respective distributed application, according to certain example embodiments. As shown in FIG. 8, line graph 805 indicates a resource demand curve for a given distributed application as a function of time. Increased demand may be correlated with an increase in virtual instances. Line graph 810 exhibits the response curve of "prewarmed" virtual instances for the respective distributed application, and line graph 815 indicates the response curve of "cold" virtual instances. At a given point of time 820, scaling using only a "cold" virtual instance scaling technique 815 may lead to resource demand outstripping available resources, which may lead to a loss of service, slowdowns, and other computational problems associated with the distributed application. However, because of the existence of "prewarmed" virtual instances 810, resources are available to handle the sudden spike in resource usage associated with the respective distributed application. Accordingly, the use of a "prewarmed" virtual instances 810 scaling technique may allow the system to proactively scale available resources and avoid demand outstripping available resources.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of a use of systems and methods for allocating computational resources to a distributed application executed on a plurality of virtual instances. These examples use cases are intended solely for explanatory purposes and not for limitation. In one case, an organization wishes to efficiently and preemptively scale dedicated hardware resources for distributed applications being executed on one or more virtual instances. The system may receive usage metrics, and determine based on the received usage metrics, whether the distributed application exhibits a cyclic usage pattern, a non-cyclic usage pattern, or a batch usage pattern. Based on the determination, the system may select an appropriate scaling technique, and automatically scale the first distributed application with the selected scaling technique. In some cases, the system may determine that the distributed application has a non-cyclic usage pattern and estimate a warmup time associated with initializing additional virtual instances (e.g., cloud servers) dedicated to executing the distributed application. When the warmup time exceeds a predetermined threshold, the system may automatically allocate additional prewarmed virtual instances to execute the distributed application in case usage demands suddenly spike unpredictable. Accordingly, the system may preemptively scale the application even when the usage pattern is non-cyclic and therefore unpredictable. In another example, the system may preemptively scale the distributed application based on a number of downstream applications. If the number of downstream applications exceeds a predetermined threshold, the system may allocate prewarmed virtual instances in order to ensure critical applications do not run out of hardware resources. In yet another example, the system may utilize Fourier transformations in order to determine whether a distributed application exhibits a cyclic or non-cyclic usage pattern, based in part on determining whether an identified frequency of hardware usage exceeds a first threshold in the transformed frequency domain usage metrics.

Examples of the present disclosure relate to systems and methods for allocating computational resources to a distributed application executed on a plurality of virtual instances. In one aspect, a system for allocating computational resources to a distributed application executed on a plurality of virtual instances is disclosed. The system may implement a method according to the disclosed embodiments. The system may include one or more processors and a memory having stored thereon computer program code that when executed by the one or more processors is configured to perform the steps of a method. The system may receive usage metrics associated with a first application. The system may determine whether the first application includes a cyclic usage pattern, a batch usage pattern, or a non-cyclic usage pattern. The system may select a scaling technique based on the determination. The system may automatically scale the first application with the selected scaling technique.

In some embodiments, the scaling technique may include a technique selected from scheduled scaling, dynamic scaling, and prewarming scaling. In some embodiments, the system may include determining a warmup time associated with initializing the first application and pre-allocating one or more virtual instances when the warmup time exceeds a predetermined threshold. In some embodiments, the usage metrics may include a current minimum virtual instance allocation and a current maximum virtual instance allocation. In some embodiments, automatically scaling the first application may further include adjusting the current minimum virtual instance allocation, the current maximum instance allocation, or combinations thereof.

In some embodiments, determining whether the first application includes a cyclic usage pattern, a batch usage pattern, or a non-cyclic usage pattern further includes determining a usage gradient based on the received usage metrics.

In some embodiments, determining the warmup time further includes determining a first amount of time to initialize an additional virtual instance, estimating a second amount of time necessary to deploy the first application on the additional virtual instance, estimating a third amount of time necessary to verify the first application has been successfully deployed on the additional virtual instance, and aggregating the first amount of time, the second amount of time, and the third amount of time to determine the warmup time.

In another aspect, a system for allocating computational resources to a distributed application executed on a plurality of virtual machines is disclosed. The system may implement a method according to the disclosed embodiments. The system may include one or more processors and a memory having stored thereon computer program code that when executed by the one or more processors is configured to perform the steps of a method. The system may initiate a first plurality of virtual machine instances configured to execute a first distributed application. The system may receive usage metrics associated with the first plurality of virtual machine instances executing the first distributed application. The system may determine that at least one virtual machine should be added to the first plurality of virtual machines responsive to a resource usage of the first plurality of virtual machine instances exceeding a maximum usage collection. The system may determine that at least one virtual machine should be removed from the first plurality of virtual machines responsive to a minimum usage allocation exceeding the resource usage of the first plurality of virtual machine instances.

In some embodiments, the system may determine whether the first distributed application includes a usage pattern, a batch usage pattern, or a non-cyclic usage pattern. The system may select a scaling technique based on the determination. The system may automatically scale the first distributed application with the selected scaling technique.

In some embodiments, the scaling technique may include a technique selected from scheduled scaling, dynamic scaling, and prewarming scaling.

In some embodiments, prewarming scaling further includes determining a warmup time associated with initializing the first distributed application and pre-allocating one or more virtual instances when the warmup time exceeds a predetermined threshold.

In some embodiments, automatically scaling the first distributed application may further include adjusting the minimum usage allocation, the maximum usage allocation, or combinations thereof.

In some embodiments, determining the warmup time may include determining a first amount of time to initialize an additional virtual instance, estimating a second amount of time necessary to deploy the first application on the additional virtual instance, estimating a third amount of time necessary to verify the first application has been successfully deployed on the additional virtual instance, and aggregating the first amount of time, the second amount of time, and the third amount of time to determine the warmup time.

In some embodiments, determining whether the first distributed application includes a cyclic usage pattern, a batch usage pattern, or a non-cyclic usage pattern further includes determining a usage gradient based on the received usage metrics.

In another aspect, a system for allocating computational resources to distributed applications each executed on a plurality of virtual instances is disclosed. The system may implement a method according to the disclosed embodiments. The system may include one or more processors and a memory having stored thereon computer program code that when executed by the one or more processors is configured to perform the steps of a method. The system may receive usage metrics associated with a plurality of distributed applications. For each distributed application, the system may determine a number of downstream applications associated with a respective distributed application. For each distributed application, the system may determine the respective distributed application includes a cyclic usage pattern, a batch usage pattern, or a non-cyclic usage pattern. For each distributed application including a cyclic usage pattern or a non-cyclic usage pattern, the system may automatically scale a number of pre-allocated virtual instances in response to the number of downstream applications exceeding a predetermined threshold.

In some embodiments, determining whether the respective distributed application includes a batch usage pattern may include calculating a usage gradient based on the received usage metrics and when the usage gradient exceeds a predetermined threshold, determine that the respective distributed application includes a batch usage pattern.

In some embodiments, determining whether the respective distributed application includes a cyclic usage pattern may further include segmenting the usage metrics into a plurality of time intervals, applying a Fourier transformation to the segmented usage metrics to transform the usage metrics from a time-domain to a frequency domain, and identifying one or more frequencies within the frequency domain that are repeated beyond a first threshold of repetition.

In some embodiments, determining whether the respective distributed application includes a non-cyclic usage pattern may further include segmenting the usage metrics into a plurality of time intervals, applying a Fourier transformation to the segmented usage metrics to transform the usage metrics from a time-domain to a frequency domain, and determining that no frequencies within the frequency domain are repeated beyond a first threshold of repetition.

In some embodiments, the system may further select an additional scaling technique based on determining whether the respective distributed application includes a cyclic usage pattern, a batch usage pattern, or a non-cyclic usage pattern, and automatically scale the respective distributed application with the selected additional scaling technique. In some embodiments, the additional scaling technique may include a technique selected from scheduled scaling, dynamic scaling, and prewarming scaling.

What is claimed is:

1. A system comprising:
   one or more processors; and
   a memory having stored thereon computer program code that, when executed by the one or more processors, is configured to cause the one or more processors to:
   receive usage metrics associated with a first distributed application executed on a plurality of virtual machine instances;
   responsive to the first distributed application comprising a cyclic usage pattern or a batch usage pattern:
   create one or more additional virtual machine instances for use during a first period of time; and
   terminate at least one of the plurality of virtual machine instances during a second period of time occurring after the first period of time;
   responsive to the first distributed application comprising a non-cyclic usage pattern, create one or more additional virtual machine instances for use during a future period of time when an allocation of computational resources to the first distributed application exceeds a threshold over the first period of time occurring before the future period of time; and
   pre-allocate the one or more additional virtual machine instances for executing the first distributed application when a warmup time associated with initializing the one or more additional virtual machine instances exceeds a predetermined threshold, wherein the warmup time comprises an aggregation of an initialization time, a deployment time, and a verification time, and wherein the verification time comprises an amount of time necessary to verify that the first distributed application has been successfully deployed on an additional virtual machine instance based on a comparison of a virtualized instance of the first distributed application to a stored copy of the first distributed application.

2. The system of claim 1, wherein the usage metrics comprise a current minimum virtual machine instance allocation and a current maximum virtual machine instance allocation.

3. The system of claim 2, wherein the computer program code is further configured to cause the one or more processors to:
   automatically scale the computational resources based on an adjustment to the current minimum virtual machine instance allocation, the current maximum virtual machine instance allocation, or combinations thereof.

4. The system of claim 1, wherein the cyclic usage pattern, the batch usage pattern, and the non-cyclic usage pattern are based on a usage gradient of the received usage metrics.

5. The system of claim 1, wherein the cyclic usage pattern, the batch usage pattern, and the non-cyclic usage pattern are based on one of a scheduled scaling technique, a dynamic scaling technique, and a prewarming scaling.

6. The system of claim 1, wherein:
   the initialization time comprises a first amount of time to initialize the one or more additional virtual machine instances; and
   the deployment time comprises a second amount of time to deploy the first distributed application on the one or more additional virtual machine instances.

7. The system of claim 6, wherein the verification time further comprises an amount of time necessary to verify that the first distributed application has been successfully deployed on the one or more additional virtual machine instances based on a comparison of a first hash value associated with the first distributed application to a second hash value associated with the first distributed application in response to deploying the first distributed application on a cloud server.

8. A system comprising:
   one or more processors; and
   a memory having stored thereon computer program code that, when executed by the one or more processors, is configured to cause the one or more processors to:
   initiate a first plurality of virtual machine instances configured to execute a first distributed application;
   receive usage metrics associated with the first plurality of virtual machine instances executing the first distributed application;

create one or more additional virtual machine instances responsive to the usage metrics indicating a resource usage of the first plurality of virtual machine instances exceeding a maximum usage allocation;
terminate at least one virtual machine instance responsive to the usage metrics indicating the resource usage of the first plurality of virtual machine instances falling below a minimum usage allocation; and
pre-allocate the one or more additional virtual machine instances for executing the first distributed application when a warmup time associated with initializing the one or more additional virtual machine instances exceeds a predetermined threshold, wherein the warmup time comprises an aggregation of an initialization time, a deployment time, and a verification time, and wherein the verification time comprises an amount of time necessary to verify that the first distributed application has been successfully deployed on an additional virtual machine instance based on a comparison of a virtualized instance of the first distributed application to a stored copy of the first distributed application.

9. The system of claim 8, wherein the computer program code is further configured to cause the one or more processors to:
automatically scale computational resources of the system with a scaling technique, wherein the scaling technique is based on a usage pattern of the first distributed application, and wherein the usage pattern is one of a cyclic usage pattern, a batch usage pattern, and a non-cyclic usage pattern.

10. The system of claim 9, wherein the scaling technique is one of a scheduled scaling technique, a dynamic scaling technique, and a prewarming scaling technique.

11. The system of claim 9, wherein automatically scaling the computational resources is based on an adjustment to the minimum usage allocation, the maximum usage allocation, or combinations thereof.

12. The system of claim 9, wherein the usage pattern of the first distributed application is based on a usage gradient of the received usage metrics.

13. The system of claim 8, wherein:
the initialization time comprises a first amount of time to initialize the one or more additional virtual machine instances; and
the deployment time comprises a second amount of time to deploy the first distributed application on the one or more additional virtual machine instances.

14. A system comprising:
one or more processors; and
a memory having stored thereon computer program code that, when executed by the one or more processors, is configured to cause the one or more processors to:
receive usage metrics associated with each of a plurality of distributed applications executed on a plurality of virtual machine instances, wherein the usage metrics indicate a cyclic usage pattern, a batch usage pattern, or a non-cyclic usage pattern for a respective distributed application;
for each distributed application, create one or more additional virtual machine instances responsive to a number of downstream applications associated with the respective distributed application exceeding a predetermined threshold, wherein the one or more additional virtual machine instances are configured for use during a future period of time when an allocation of computational resources to each distributed application exceeds a threshold within a first period of time occurring before the future period of time; and
pre-allocate the one or more additional virtual machine instances for executing the plurality of distributed applications when a warmup time associated with initializing the one or more additional virtual machine instances exceeds a predetermined threshold, wherein the warmup time comprises an aggregation of an initialization time, a deployment time, and a verification time, and wherein the verification time comprises an amount of time necessary to verify that the plurality of distributed applications have been successfully deployed on the one or more additional virtual machine instances based on a comparison of a virtualized instance of each distributed application to a stored copy of the respective distributed application.

15. The system of claim 14, wherein the respective distributed application comprises a batch usage pattern when a usage gradient of the received usage metrics exceeds a predetermined threshold.

16. The system of claim 14, wherein the respective distributed application comprises a cyclic usage pattern when
one or more frequencies within a frequency domain are repeated beyond a first threshold of repetition, wherein the frequency domain is based on a Fourier transformation of segmentations of the received usage metrics in a plurality of time intervals of a time domain.

17. The system of claim 16, wherein the Fourier transformation comprises one or more of a fast Fourier transformation, a discrete Fourier transformation, and a short time Fourier transformation.

18. The system of claim 14, wherein the respective distributed application comprises a non-cyclic usage pattern when
no frequencies within a frequency domain are repeated beyond a first threshold of repetition, wherein the frequency domain is based on a Fourier transformation of segmentations of the received usage metrics in a plurality of time intervals of a time domain.

19. The system of claim 14, wherein the computer program code is further configured to cause the one or more processors to:
automatically scale a number of pre-allocated virtual machine instances with a selected scaling technique based on whether the respective distributed application comprises a cyclic usage pattern, a batch usage pattern, or a non-cyclic usage pattern.

20. The system of claim 14, wherein the verification time further comprises an amount of time necessary to verify that the plurality of distributed applications has been successfully deployed on the one or more additional virtual machine instances based on a comparison of a first hash value associated with each distributed application to a second hash value associated with each distributed application in response to deploying the plurality of distributed applications on a cloud server.

* * * * *